March 6, 1962  B. DUBSKY ETAL  3,023,614
ELECTROMAGNETIC TORSIOMETER

Filed March 17, 1959

INVENTORS
Bořivoj Dubský ~ Oldřich
Straka ~ František Rajhel
By Richard [...]
agt United States Patent Office 3,023,614
Patented Mar. 6, 1962

3,023,614
ELECTROMAGNETIC TORSIOMETER
Borivoj Dubsky, Oldrich Straka, and Frantisek Rajhel, Prague, Czechoslovakia, assignors to Vyzkumny a zkusebui letecky ustav, Letnany, near Prague, Czechoslovakia
Filed Mar. 17, 1959, Ser. No. 799,866
Claims priority, application Czechoslovakia Mar. 24, 1958
3 Claims. (Cl. 73—136)

This invention relates to an electromagnetic torsiometer utilising the magnetostrictive properties of ferromagnetic materials.

There are known many different kinds of torsiometers based on different principles, as for example induction, capacity, resistance, piezoelectric magnetostrictive, mechanical and optical torsiometers. Many such devices require an extremely precise method of production as well as expensive material. The electric torsiometers require a very complicated arrangement including several stages of amplification. The greatest drawback of known magnetostrictive torsiometers lies primarily in their sensitiveness to the variation of external magnetic stray fields.

The electromagnetic torsiometer which is the object of the present invention is, in contradistinction to known torsiometers, very cheap, simple, without special requirement as to its manufacture and applied materials, its further essential feature being its sufficient output, which means that it does not require any auxiliary amplification. The electromagnetic torsiometer according to the present invention is composed of two ferromagnetic torsional bodies which induce, by means of two exciting circuits connected in opposite directions, into the pick-up circuit an electromagnetic force proportional to the twist of the torsional body, i.e. proportional to the twisting moment. Owing to the reverse connection of the exciting circuit, suppression of the effect of outer or external magnetic fields upon the voltage induced in the pick-up circuits is achieved.

The accompanying drawing shows by way of example the electromagnetic torsiometer which is the object of the present invention.

Figure 1:
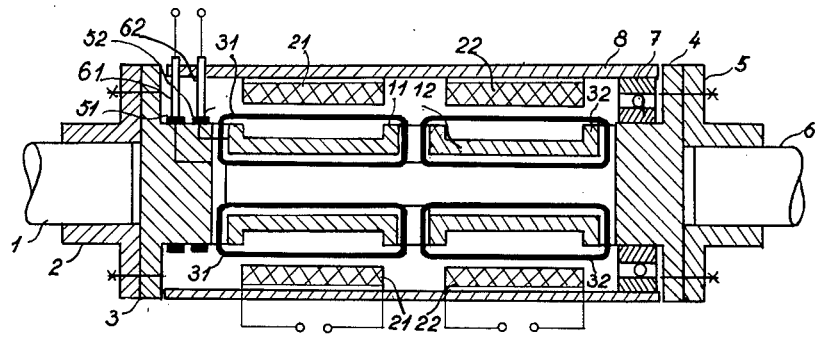

The electromagnetic torsiometer comprises, according to FIG. 1, two rigidly connected torsional bodies 11 and 12 in the form of tubes fastened to each other and connected, at one end, to flanges 2 and 3 and by means of said flanges to the shaft 1. The said torsional bodies are fastened in a similar manner to 4 and 5 and by means of said flanges to the shaft 6 of the mechanism by which the torsiometer is loaded. Two toroidal windings 31 and 32 pass through the torsional bodies. Said windings 31 and 32 are connected to rings 51 and 52 to which brushes 61 and 62 are pressed. Said torsional bodies 11 and 12 are surrounded by immovable rigid pick-up coils 21 and 22 connected to a pick-up circuit 10, 13, 14, 15, 41 and 42 and fastened to a rigidly-fixed housing 8. The whole torsiometer is protected by means of said rigidly-fixed housing which supports said brushes and in which said flange 4 is seated by means of an antifriction bearing 7.

Figure 2:
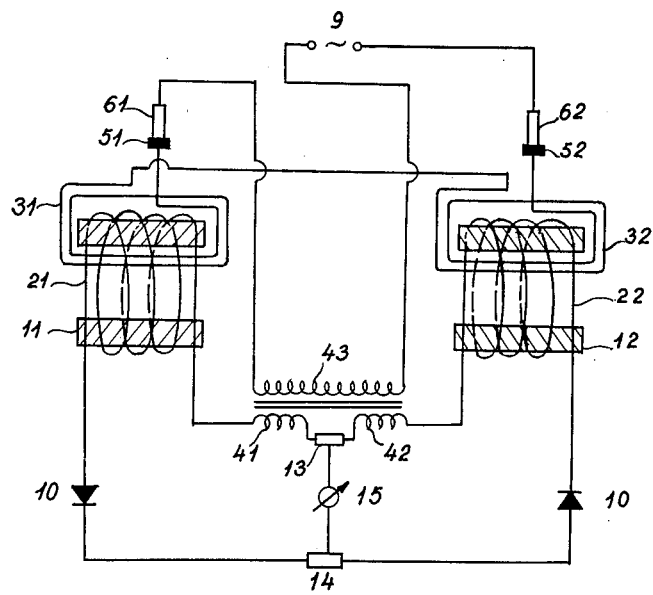

FIG. 2 shows the wiring diagram of the illustrative embodiment shown in FIG. 1. One side of an exciting circuit is connected through the primary winding 43 of a transformer 40 and, further, on through the brush 61 and the ring 51 to the beginning of the toroidal winding 31 which passes through the torsional tube 11. The end of said toroidal winding 31 is connected to one end of the toroidal winding 32 which passes through the torsional tube 12. The other end of said toroidal winding 32 is connected through the ring 52 and the brush 62 back to the other side of the exciting circuit.

The pick-up circuit is connected as follows: One end of the pick-up winding 21 is connected to the beginning of secondary winding 41 of the transformer 40 and the end of said secondary winding 41 is connected through a potentiometer 13 to the beginning of the secondary winding 42 of the transformer 40. The end of said secondary winding 42 is connected to the beginning of the pick-up winding 22, the end of which passes through a rectifier 10, potentiometer 14, and another rectifier 10 to the beginning of pick-up winding 21. A measuring device 15 is introduced into the middle branch of said pick-up circuit between the two runners of the potentiometers 13 and 14.

A cylindrical electromagnetic field induced in the torsional body 11 by alternating current passing through the toroidal winding 31 in one direction and through the toroidal winding 31 on the torsional body 12 in the opposite direction, is deformed by the effect of a twisting moment acting upon said torsional bodies in such a manner that the moment creates a longitudinal field component which induces an electromotive force in said pick-up coil 21 in one direction and in the pick-up coil 22 in the opposite direction.

The electromotive forces induced in said secondary windings 41 and 42 are reciprocally of the same direction and serve for displacement of the operating points of said rectifiers into more favourable parts of their characteristic curves. The voltage induced in the pick-up coil 21 acts against the voltage of the secondary winding 41, while the voltage induced in the pick-up coil 22 acts, on the contrary, in the direction of the voltage of the secondary winding 42. In this way the symmetry of the circuit is disturbed and a current proportional to the voltages induced in both said pick-up coils, and therefore also proportional to the measured torque, flows through the measuring device 15. By contrast, the voltages induced in said pick-up coils due to the influence of outer magnetic stray fields respectively act in the same direction as the voltages of said secondary windings, and as a result, have no effect upon the symmetry of the circuit and, thus, no effect upon the current which passes through the measuring device.

This permits the use of a torsiometer made in accordance with the principles of the present invention when measuring the twisting moment of electric motors or combustion engines directly at their shafts, whereas such use of previous types of electromagnetic torsiometers has been difficult owing to the effect of strong magnetic stray fields.

What we claim is:

1. In an electromagnetic torsiometer, the combination of ferromagnetic torsional body means adapted to transmit a torque between the opposite ends thereof, two toroidal exciting coils wound on and through respective axial portions of said body means, alternating current energizing means connected to said two toroidal exciting coils with the latter in series-opposition to normally cylindrically magnetize said respective axial portions in opposite directions, two pick-up coils wound around said respective axial portions of the torsional body means in orthogonal relationship with respect to the related exciting coils so that substantially equal voltages of opposed polarity are induced in said two pick-up coils only in response to torsional stressing of said body means, and pick-up bridge circuit means connected to said pick-up coils and operative to detect only said equal voltages of opposed polarity induced in the pick-up coils by torsional stressing of said body means and being unaffected by voltages of the same polarity induced in said pick-up coils by stray magnetic fields.

2. In an electromagnetic torsiometer, the combination as in claim 1; wherein said torsional body means is rotatable with said exciting coils thereon; and further comprising a fixed housing extending around said torsional body means and having said pick-up coils fixed therein.

3. In an electromagnetic torsiometer, the combination as in claim 1; further comprising transformer means having a primary winding connected in said energizing means and two secondary windings connected in series with said two pick-up coils in respective legs of said bridge circuit means so that said equal voltages of opposite polarity induced in the pick-up coils are respectively of the same polarity and of opposite polarity with respect to the voltages induced in the related secondary windings of said transformer means.

References Cited in the file of this patent

UNITED STATES PATENTS

| | | |
|---|---|---|
| 2,531,228 | Macgeorge | Nov. 21, 1950 |
| 2,967,426 | Dahle | Jan. 10, 1961 |

FOREIGN PATENTS

| | | |
|---|---|---|
| 442,441 | Great Britain | Feb. 3, 1936 |